United States Patent [19]

Taub

[11] 3,929,968

[45] Dec. 30, 1975

[54] DRY COLLECTION OF WASTE MATERIALS

[75] Inventor: Steven I. Taub, Claymont, Del.

[73] Assignee: E. I. Du Pont de Nemours & Co., Wilmington, Del.

[22] Filed: Oct. 10, 1973

[21] Appl. No.: 405,054

[52] U.S. Cl. ............................... 423/242; 423/240
[51] Int. Cl.² .......................................... C01B 17/00
[58] Field of Search ........................... 423/242–244, 423/240, 241

[56] References Cited

UNITED STATES PATENTS

| 2,333,193 | 11/1943 | Persson et al. | 423/242 |
| 2,375,560 | 5/1945 | Hutchinson et al. | 423/242 |
| 3,343,908 | 9/1967 | Wickert | 423/244 |
| 3,687,623 | 8/1972 | Terrana et al. | 423/242 |
| 3,785,119 | 1/1974 | McIlvaine | 423/242 |

FOREIGN PATENTS OR APPLICATIONS

| 510,415 | 4/1952 | Belgium | 423/242 |

Primary Examiner—Oscar R. Vertiz
Assistant Examiner—Gregory A. Heller

[57] ABSTRACT

The noxious components of hot, gaseous effluents, e.g., the effluent from an incinerator, can be eliminated by a process which does not require an aqueous discharge. In the process the gaseous effluent is cooled in an evaporative cooler, particulates are then removed in a baghouse or other dry collecting device, the acid or basic gases in the effluent are then absorbed and converted to a salt solution or slurry in a scrubber, and the salt solution or slurry is recycled to the evaporative cooler.

7 Claims, 2 Drawing Figures 3,929,968

DRY COLLECTION OF WASTE MATERIALS

BACKGROUND OF THE INVENTION

The removal of undesirable components from the environment is of considerable importance to our society. Many industries and municipalities employ incinerators to eliminate undesired organics, organo-metallic compounds, halogenated organics, etc. However, the noxious materials formed as a result of incineration or other hot gaseous processes must be eliminated by flue gas cleaning techniques. These techniques employ bag filters, electrostatic precipitators, scrubbers, cyclones, and packed beds to remove the particulate pollutants from the flue gases and scrubbers to minimize the noxious gaseous effluents.

A problem has arisen with respect to the use of scrubbers as a pollution control tool. The scrubber liquid blow-down can cause serious water pollution problems. If the scrubber effluent contains solid particulates, they can be filtered and removed. Some metallic wastes may settle out or they may be precipitated from solution by pH adjustment. However, these treatments are expensive and water discharge can become a problem when soluble salts or acids in addition to solids are entrained in the scrubber effluent.

SUMMARY OF THE INVENTION

I have discovered a total waste disposal system which will eliminate the usual problems caused with the use of scrubbers to cleanse gases.

The process of the invention is useful for treating hot gas streams to eliminate undesirable components and involves the following steps:

a. feeding a hot gas stream containing particulates and gaseous acidic or basic components into an evaporative cooler wherein the gas is cooled to a temperature above the dew point, generally between 250° and 1,000°F.;

b. feeding the cooled gas stream into a collection means for the dry collection of the particulates present in the gas stream;

c. feeding the gas stream from step (b) into a scrubber wherein the stream is contacted with an aqueous scrubbing solution to absorb the acidic or basic components, the scrubber will also remove any particulates that passed through the collection means;

d. removing the scrubbed gas stream from the scrubber;

e. adjusting the pH of the scrubbing solution by the addition of sufficient salt forming chemical to form a salt, either water soluble or insoluble, with the absorbed acidic or basic component; and f. feeding the adjusted scrubbing solution or slurry containing the salt to the evaporative cooler where it is combined and heated with the hot gas, the salt subsequently being collected as a dry solid in the evaporative cooler or the collection means of step (b), most or all of the salt being collected in means (b).

Preferably, the process of the invention is used to treat hot, acidic gases and the salt produced is water soluble.

The principal advantage of the process of the invention is that it does not involve any aqueous discharge, i.e., the scrubber effluent is fed to the evaporative cooler where the water vaporizes and the particulates are collected as dry solids. Thus, the only non-gaseous discharge from the process is a dry solid.

DESCRIPTION OF THE INVENTION

Figure 1:
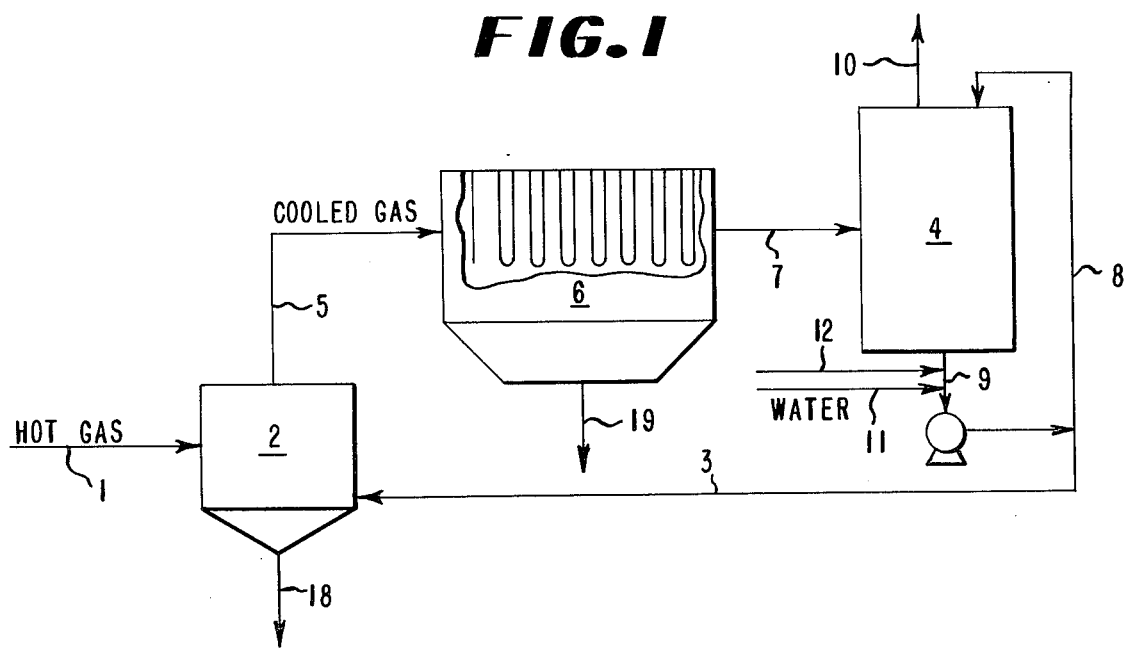
FIG. 1 is a flow diagram of an embodiment of the process of the invention.

The process of the invention is useful to treat any hot process gases, i.e., gases at temperatures above 250°–350°F., which contain particulate and gaseous acidic or basic pollutants.

The particulates can be anything collectable by a dry collector, e.g., dust, fly ash, carbon, salts, metal oxides and the like. The gaseous acidic pollutants include the following acid gases, e.g., gases containing HCl, $SO_2$, HBr, $NO_2$, $HNO_3$, HF, $Cl_2$, $Br_2$ or $P_2O_5$. The gaseous gasic pollutants can include $NH_3$, or metallic fumes such as NaOH, $Mg(OH)_2$ and the like.

The process will now be explained with reference to FIG. 1.

The hot process gas 1 containing the gaseous acidic or basic components and the particulates is fed into an evaporative cooler 2 wherein the gas is cooled to a temperature above the dew point, generally between 250° and 1,000°F., preferably 400° and 450°F.

The evaporative cooler acts to cool the hot gas and also evaporate the purge 3 of adjusted scrubbing solution from the scrubber 4. In operation the hot gases entering the cooler entrain the liquid droplets and solid particulates in the purge and the liquid is evaporated. The evaporative cooler could be a spray dryer or a gas cooler wherein the liquid is atomized by a rotating disc or a spray nozzle or other means. Some solids may collect in the bottom of the cooler and they can be discharged at appropriate times as stream 18.

The operating conditions for the evaporative cooler will vary depending upon the nature of the hot gas and purge feeds. One critical feature is that the hot gas is maintained at a temperature above the dew point.

It is important that the evaporative cooler be able to control outlet gas temperature very effectively. If it cannot, serious damage to process equipment downstream of the cooler may occur. For example, if the process of the invention was to control the discharge of a waste incinerator and a baghouse was chosen as the particulate collection means, damage to the baghouse could take place if the evaporative cooler is not able to respond quickly to changes in burning rate, gas temperature, or both. If the temperature of the inlet gas stream were to suddenly drop and the evaporative cooler was slow in responding, the baghouse bag filters could become coated with mud. If the temperature were to increase suddenly, and the evaporative cooler was not able to respond quickly, the bag filters in the baghouse could be burned. For these reasons, the evaporative cooler must be capable of fast response.

The cooled gas stream 5 leaving the cooler 2 contains the original gaseous acidic or basic components and essentially all of the particulates and also the salt, as a particulate, released by the evaporation of the adjusted scrubbing solution 3. The cooled gas stream is fed into a dry collection means 6 wherein the particulates are removed. The dry collection means can be any of those commercially used, i.e., a baghouse containing bag filters, electrostatic precipitators, cyclones or packed beds. This collection means will be operated in the conventional manner. The solids collected in this means are discharged as stream 19.

The essentially particulate free gas 7 is then fed into a scrubber 4 wherein the water soluble acidic and basic components of the gas are absorbed in an aqueous scrubbing solution. This scrubber will also collect any particulates that passed through the dry collection means. The operating conditions in the scrubber as to temperatures, pressures and contact time will vary depending upon the makeup of the gas stream 7. However, these conditions will be conventional and apparent to those skilled in the art.

In the scrubber illustrated in FIG. 1, the gas 7 is fed into the scrubber 4 wherein it flows either countercurrent, cocurrent or cross flow to the aqueous scrubbing solution 8 which is fed into the scrubber. The water soluble acidic or basic components are absorbed or combined in the scrubbing solution and removed from the bottom 9 of the scrubber while the scrubbed gas 10 exits at the top or side.

If desired, the scrubbing solution can contain a salt former to react with the water soluble acidic or basic component and form a water soluble or insoluble salt. The salt formers which can be used are those which will form a water soluble or insoluble salt with the absorbed acidic or basic component. Thus, the salt former to be used will depend upon the nature of the hot gas stream and include caustic, lime, limestone, potassium hydroxide, or any of the mineral acids or organic acids.

The process of the invention is not limited to scrubbing with an aqueous solution, although aqueous solutions are preferred. For example, a suitable solvent for a particular gas may be an organic or inorganic solution. Usually, however, a solution of this type is costly and must be retained intact in the system. Therefore, a means must be employed to cool the scrubbing solution to a temperature low enough so that evaporative losses are small. This can be done by reference to FIG. 1. Stream 7 can be directed to a heat exchanger to cool the gas and thus lower the vapor pressure of the solvent. If this is not practical, a cooler can be placed in the circulating loop, 8, to insure cooling of the absorbant material so that valuable solvent in the gas is condensed and recovered.

Figure 2:
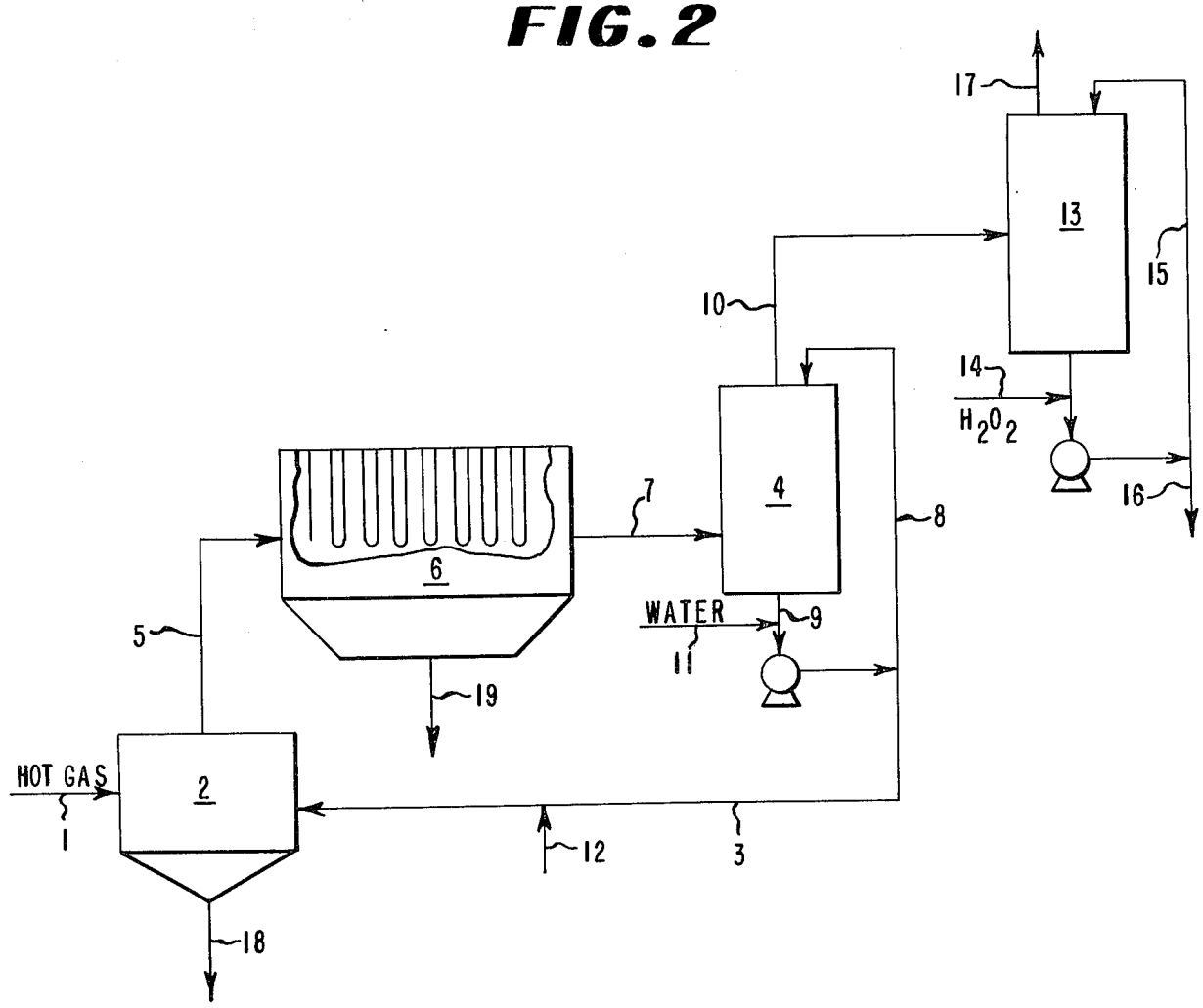
FIG. 2 illustrates an alternate embodiment particularly designed for the recovery of a gaseous component, e.g., $SO_2$, from the hot gas stream.

In some instance, as illustrated in FIG. 2, the salt former will not be added to the recycling scrubbing solution, but only to the portion thereof which is withdrawn from the scrubber. This embodiment can be employed when it is desired to recover the acidic or basic component in a useful form rather than convert it into a salt.

The amount of salt former added is that required to remove the acidic or basic component present. This will vary widely depending upon the compositon of the hot gas treated.

In the embodiment illustrated in FIG. 1, to the scrubbing solution leaving the scrubber 9 is added makeup water 11 and base or acid 12. The amount of makeup water added is equal to the evaporative losses. The solution is fed into a pump whereby a portion is recycled to the scrubber and a purge 3 is drawn off. The amount of salt or slurry in the purge will vary depending on the hot gas involved. Generally, it is preferred to recycle a concentrated scrubbing solution to the scrubber; thus, the purge will normally range from 1 to 15% of the scrubbing solution.

The purge 3 of adjusted scrubbing solution or slurry made up of soluble and/or insoluble materials is then fed into the evaporative cooler 2 as previously described. In the cooler the water in the purge 3 is vaporized and the salt is collected in the bottom of the cooler 2 or the dry collector 6.

In the embodiment illustrated in FIG. 2, two alternatives are employed.

The recycling scrubbing solution 8 does not contain any salt former; the salt former 12 is added only to the purge and in an amount sufficient to convert all the water soluble acidic or basic material present in the purge into a salt; however, if desired, an excess of salt former can be employed.

Furthermore, this embodiment permits the recovery of gaseous components that are not absorbed by the water in the scrubber, i.e., under most operating conditions very little $SO_2$ or other insoluble gases such as $Cl_2$ or $Br_2$ will be absorbed in an aqueous scrubbing solution.

In this embodiment the $SO_2$ containing scrubbed gas 10 is fed into a $SO_2$ removal means 13. This means can be any of the conventional ones used to remove $SO_2$ from gases, e.g., a scrubber employing a scrubbing solution of sulfuric acid and a peroxygen compound, e.g., $H_2O_2$, or $CaCO_3$, $NaOH$, $Mg(OH)_2$ or calcined dolomite.

In the embodiment illustrated in FIG. 2 hydrogen peroxide 14 is added to a recycling scrubbing solution containing 30 to 70% by weight sulfuric acid 15. The hydrogen peroxide removes the $SO_2$ from the gas stream and converts it into sulfuric acid. A purge of sulfuric acid 16 is withdrawn from the system and the $SO_2$ free gas 17 exits the scrubber as an overhead stream.

In a typical embodiment a hot gas stream can exit a process with 30,000,000 BTUs/hour of heat energy. With this amount of heat, from 20 to 50 gallons per minute of water can be evaporated in the evaporative cooler; the exact amount depending upon the humidity of the hot gas entering the cooler.

Thus, the purge 3 to the cooler can be up to 15% of the scrubbing solution, assuming a liquid to gas ratio in the scrubber of 10 gal/1000 cf.

As a result, the only non-gaseous discharge from the process will be that collected in the dry collector or the evaporative cooler, i.e., a dry solid of substantially smaller volume than the scrubber purge.

I claim:

1. A process for treating hot gas streams to remove acidic or basic gaseous components comprising the steps a. passing the hot gas through an evaporative cooler in admixture with a salt-containing scrubbing solution as defined hereinbelow, by which the hot gas is cooled above the dew point by evaporation of liquid from the scrubbing solution and solid particles of salt are formed in dispersion with the gas;

b. feeding the cooled gas having salt particles dispersed therein into a dry collector means by which the salt particles and any other dispersed solids are removed from the gas stream;

c. feeding the gas from which the solids have been removed into a scrubber wherein the acidic or basic components of the gas are absorbed into a scrubbing solution;

d. discharging the scrubbed gas from the scrubber and adjusting the pH of the scrubbing solution containing absorbed acidic or basic components by admixing therewith a salt-forming chemical by which a salt of the acidic or basic components is formed in dispersion within the scrubbing solution; and e. feeding the salt-containing scrubbing solution to the evaporative cooler of step (a).

2. The process of claim 1 wherein the salt forming chemical is added to the scrubbing solution in the scrubber.

3. The process of claim 1 wherein the hot gas contains $SO_2$ and the scrubbed gas stream from step (c) is treated to remove the $SO_2$.

4. The process of claim 1 wherein the hot gas contains essentially water insoluble gaseous components and the scrubbed gas stream from step (c) is treated to remove these components.

5. The process of claim 4 wherein the essentially water insoluble gaseous components are $Cl_2$ or $Br_2$.

6. The process of claim 1 wherein an aqueous scrubbing solution is employed.

7. A process for treating hot gas streams to remove gaseous acidic components comprising the steps a. passing the hot gas through an evaporative cooler in admixture with a salt-containing scrubbing solution as defined hereinbelow, by which the hot gas is cooled above the dew point by evaporation of liquid from the scrubbing solution and solid particles of salt are formed in dispersion with the gas;

b. feeding the cooled gas having salt particles dispersed therein into a dry collector means by which the salt particles and any other dispersed solids are removed from the gas stream;

c. feeding the gas from which the solids have been removed into a scrubber wherein the acidic component of the gas is absorbed into a scrubbing solution;

d. discharging the scrubbed gas from the scrubber and raising the pH of the scrubbing solution containing the absorbed acidic component by admixing therewith a salt-forming basic chemical by which a salt of the acid and basic chemical is formed in dispersion within the scrubbing solution; and e. feeding the salt-containing aqueous scrubbing solution to the evaporative cooler of step (a).

* * * * *